United States Patent [19]

Luijtjes

[11] Patent Number: 4,949,345
[45] Date of Patent: Aug. 14, 1990

[54] METHOD AND APPARATUS FOR REDUCING THE EFFECT OF RANDOM POLARIZATION ON THE POWER/ENERGY OUTPUT OF LASERS

[75] Inventor: Nicolaas G. Luijtjes, Austin, Tex.

[73] Assignee: Microelectronics and Computer Technology Corporation, Austin, Tex.

[21] Appl. No.: 374,033

[22] Filed: Jun. 30, 1989

[51] Int. Cl.⁵ .............................................. H01S 3/10
[52] U.S. Cl. ...................................... 372/27; 372/31; 372/38
[58] Field of Search ................. 372/25, 27, 29, 30, 372/31, 38

[56] References Cited

U.S. PATENT DOCUMENTS

| | | | |
|---|---|---|---|
| 3,899,748 | 8/1975 | Bodlaj | 331/94.5 |
| 3,914,018 | 10/1975 | DeShazer | 350/157 |
| 4,071,751 | 1/1978 | Waksberg | 372/27 |
| 4,277,137 | 7/1981 | Upatnicks et al. | 350/162 |
| 4,309,669 | 1/1982 | Bloot et al. | 331/94.5 |
| 4,480,916 | 11/1984 | Bareket et al. | 356/351 |
| 4,525,034 | 6/1985 | Simmons | 350/395 |
| 4,611,270 | 9/1986 | Klauminzer et al. | 372/30 |
| 4,636,075 | 1/1987 | Knollenberg | 356/336 |
| 4,676,644 | 6/1987 | Canteloup | 356/351 |
| 4,726,032 | 2/1988 | Hoag | 372/106 |
| 4,734,912 | 3/1988 | Scerbak et al. | 372/27 |
| 4,746,784 | 5/1988 | Vermij | 219/121 |
| 4,768,198 | 8/1988 | Deki | 372/30 |

FOREIGN PATENT DOCUMENTS

| | | | |
|---|---|---|---|
| 0218449 | 4/1987 | European Pat. Off. | 372/30 |
| 2475220 | 8/1981 | France | 372/27 |

Primary Examiner—William L. Sikes
Assistant Examiner—Robert E. Wise
Attorney, Agent, or Firm—Fulbright & Jaworski

[57] ABSTRACT

The effects of random polarization of a laser beam is reduced by separating the polarized laser beam into first and second polarized components that are orthogonal to each other, and measuring the energy in each of the first and second components. The total energy in both of the first and second components are compared with a predetermined energy level. The energy output of the laser beam is controlled in response to the measured comparison.

7 Claims, 2 Drawing Sheets

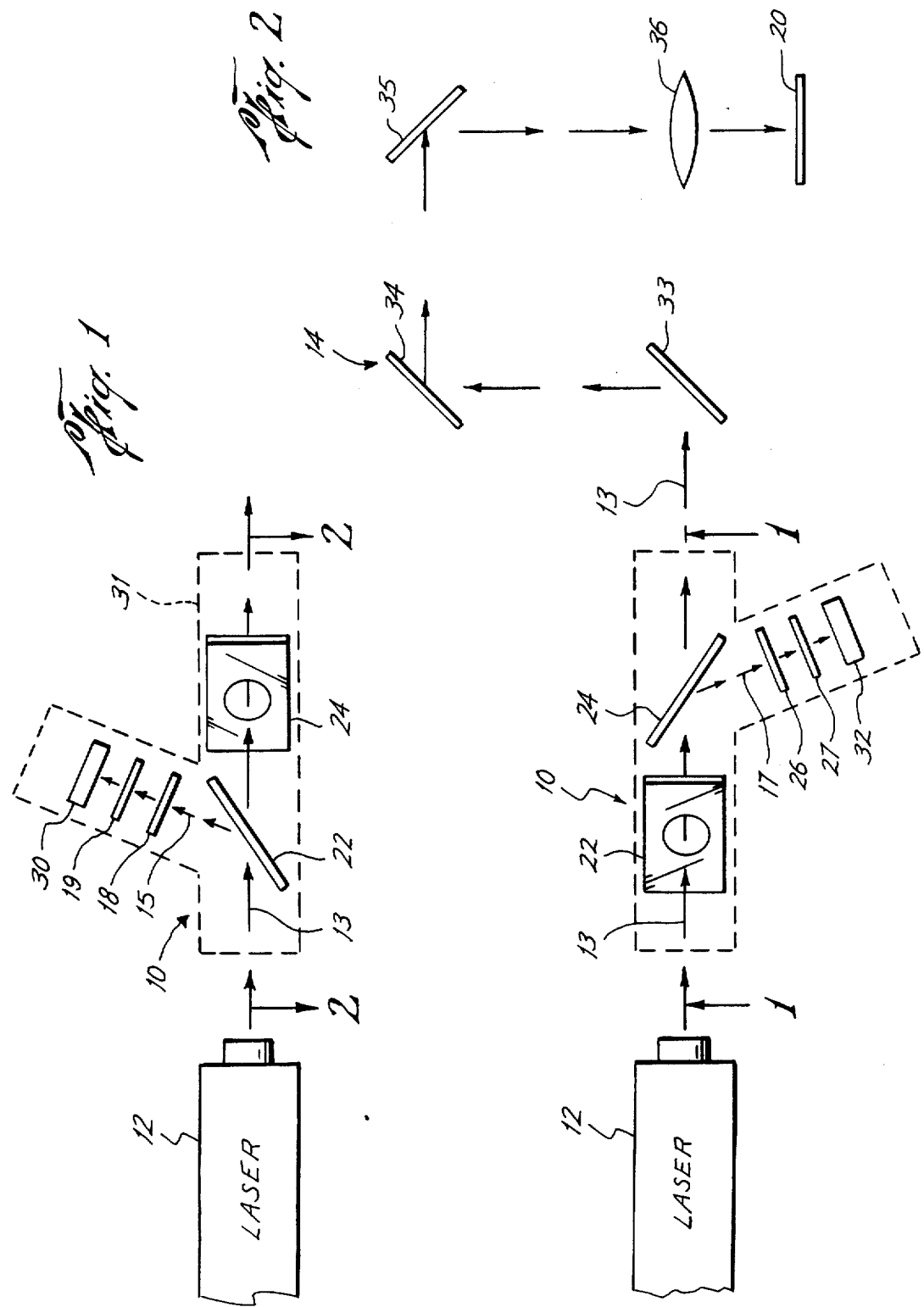

METHOD AND APPARATUS FOR REDUCING THE EFFECT OF RANDOM POLARIZATION ON THE POWER/ENERGY OUTPUT OF LASERS

BACKGROUND OF THE INVENTION

Certain lasers emit radiation with randomly varying polarization. This random polarization interacts with the optics that are downstream from the laser. This results in undesirable variations in the power or energy that is received at the workpiece from the laser.

The present invention is directed to an apparatus and method of reducing the effects of random polarization on the output uniformity of a laser beam. In particular, the method and apparatus measures the effects of the random polarization and compensates for the effects to produce repeatable uniform power or energy levels.

The present invention is directed to a method of and an apparatus for reducing the effects of random polarization on the output uniformity of a laser beam and includes generating a polarized laser beam, separating a fraction of the laser beam into first and second polarized components that are orthogonal to each other, and measuring the energy in each of the first and second components. The method also includes measuring the total energy in both of the first and second components and comparing the total power or energy with a predetermined set point, and thereafter controlling the power or energy output of the laser beam in response to the comparison of the output with the set point.

Another object of the present invention includes integrating the total energy prior to comparing the total energy with a predetermined set point.

Still a further object of the present invention is wherein in one embodiment the energy is controlled by turning the laser off and on and in another embodiment the energy is controlled by controlling the intensity of the laser.

Still a further object of the present invention is the provision of an apparatus for reducing the effects of random polarization by providing first and second polarizing beams splitters positioned in the polarized laser beam and positioned orthogonally to each other. The first and second beam splitters each reflect a portion of the laser beam. Laser detecting and measuring means detect and measure the reflected polarized energy from each of the beam splitters, and comparison means compares the sum of the measured energy from both of the beam splitters with a predetermined energy level. Control means between the comparator and the laser are provided for controlling the output energy of the laser.

The beam splitters may be dielectric windows and the laser detecting and measuring means may be photodiodes.

Other and further objects, features and advantages will be apparent from the following description of presently preferred embodiments of the invention, given for the purpose of disclosure and taken in conjunction with the accompanying drawings.

BRIEF DESCRIPTION OF THE DRAWINGS

FIG. 1 is an elevational schematic illustrating a portion of the present invention, and is taken along the line 1—1 of FIG. 2, FIG. 2 is a schematic elevational view taken along the line 2—2 of FIG. 1 and includes downstream optics.

DESCRIPTION OF THE PREFERRED EMBODIMENT

Figure 3:
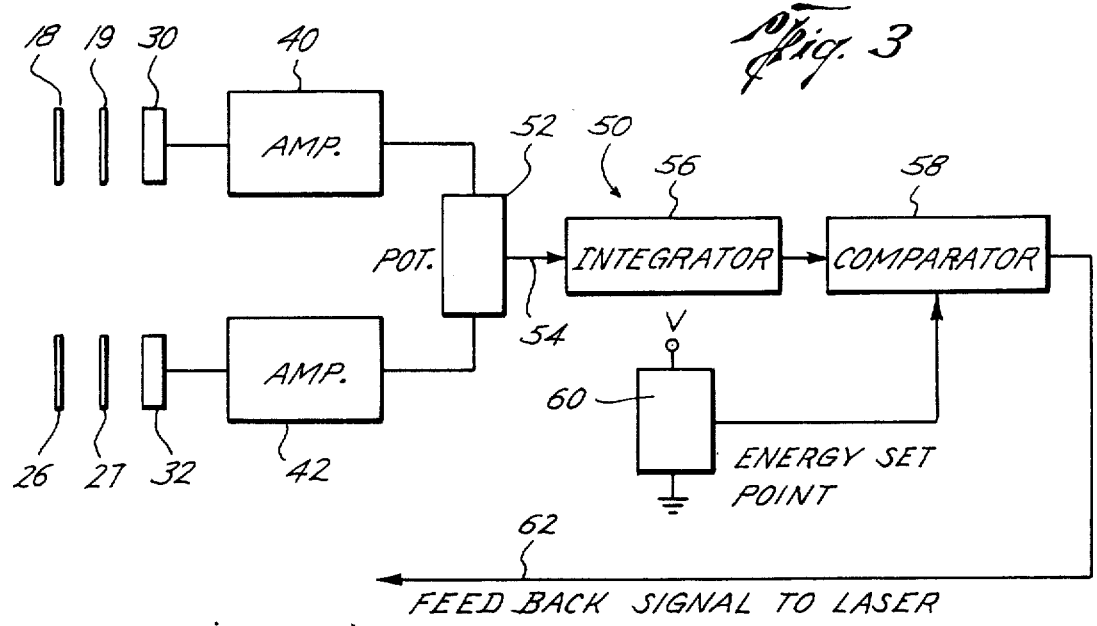
FIG. 3 is an electrical block diagram illustrating one way of sensing, measuring and controlling the effects of random polarization of a laser output.

Referring now to the drawings, and particularly to FIGS. 1 and 2, the reference numeral 10 generally indicates the apparatus of the present invention in which a multi-mode pulsed laser, such as a NdYAG laser, is provided for performing a variety of functions, such as writing, cutting, and bonding. However, the laser 12 emits a radiation beam 13 with randomly varying polarization. This random polarization from the laser 12 interacts with a conventional optic system generally indicated by the reference numeral 14 that is downstream from the laser 12. Thus, undesired pulse-to-pulse variations in the laser energy are received at the workpiece 20.

The present invention is directed to a method and apparatus for measuring the effects of the random polarization from the laser 12, and reducing the effects of the random polarization on the output uniformity of the laser beam. This allows the present system to produce repeatable uniform pulse-to-pulse energy levels.

First 22 and second 24 polarizing beam splitters are provided which are positioned in the polarized laser beam 13. The beam splitters 22 and 24 are positioned orthogonally to each other as best seen in FIGS. 1 and 2. The first and second beam splitters 22 and 24 are placed at an angle of incidence to the laser beam 13 so that a portion of the laser energy is reflected while the rest is transmitted through the optical system 14. The first beam splitter 22 reflects a portion 15 and the second beam splitter 24 reflects a portion 17 of the laser beam 13. With the two orthogonally positioned beam splitters 22 and 24, all polarization in the beam 13 can be measured regardless of its original orientation. While the first 22 and second 24 polarizing beam splitters may be of any suitable type, preferably they are dielectric mirrors such as Brewster Windows.

The reflected polarized energy from each of the beam splitters 22 and 24 is measured. Thus, reflected beam 15 may pass through one or more diffusers 18 and 19 and onto a suitable laser detector such as a photodiode 30. Similarly, the reflected polarized energy 17 is transmitted, if desired, to one or more diffusers 26 and 27 and to a suitable laser detector such as a photodiode 32. The beam splitters 22 and 24 and their energy measuring systems may be enclosed in a suitable housing 31. The laser light beam 13 which passes through the beam splitters 22 and 24 is transmitted to the optic system 14 which may include mirrors 33, 34, 35, and lens 36 before being received at the workpiece 20.

The total polarized energy is measured by the detectors 30 and 32. The measurements from the detectors 30 and 32, as best seen in FIG. 3, may be amplified in amplifiers 40 and 42, respectively. One control circuit, generally indicated by the reference numeral 50, shown in FIG. 3, sums the measured energy from both of the beam splitters 22 and 24, as measured by the detectors 30 and 32, respectively. The control circuit 50 then compares the sum with a predetermined energy level and controls the energy output of the laser 12 in response to the comparison of the total energy with a predetermined energy set level. In the embodiment of FIG. 3, the amplifiers 40 and 42 are connected to a potentiometer 52 having an output 54 which is set to compensate for variations in the outputs from the amplifiers 40 and 42. The output from the potentiometer 52 is fed into an integrator 56 which integrates the sum of the energy measured by the detectors 30 and 32 and feeds the integrated sum to one input of a comparator 58. The output from the integrator 56 is compared with a second input to the comparator from a predetermined energy set point which may be set by potentiometer 60. The comparator 58 then has an output which provides a feedback signal 62 to the laser 12. In the embodiment of FIG. 3, the control circuit 50 determines when a predetermined energy level has been reached by measuring the output of the integrator 56 relative to the energy set point in potentiometer 60. When the predetermined energy level is reached, the comparator 58 provides a feedback signal 62 to the laser power supply shutting down the laser power supply thereby controlling the total energy of the laser pulse.

Figure 4:
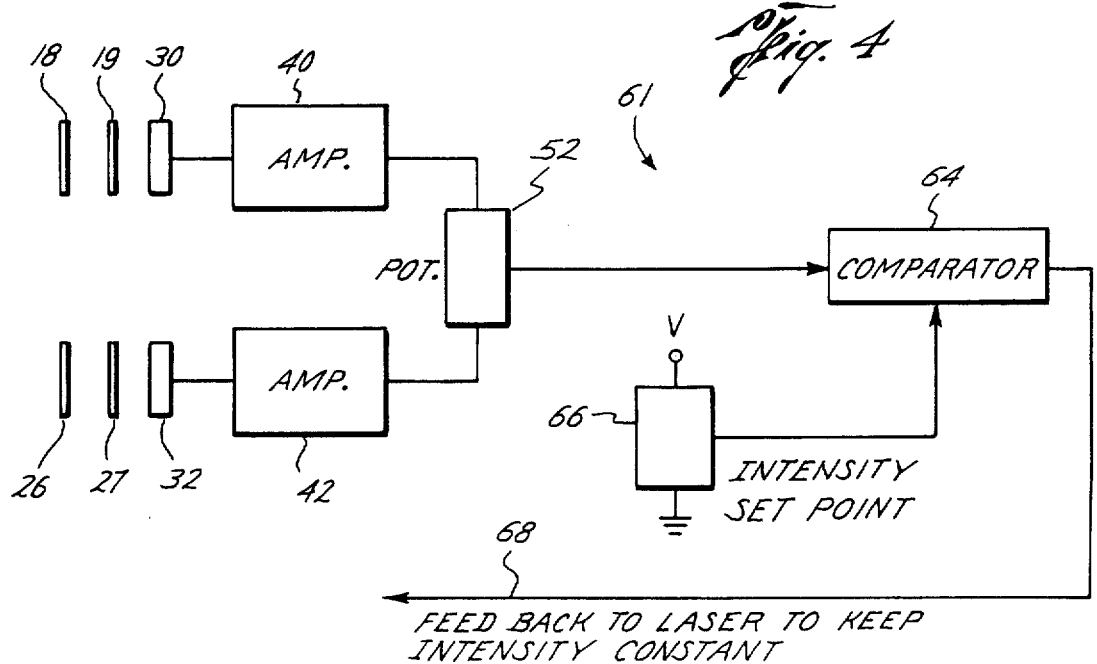
FIG. 4 is an electrical block diagram of another apparatus for reducing the effects of random polarization of a laser.

Referring now to FIG. 4, another embodiment is shown of a control circuit generally indicated by the reference numeral 61. Again, a potentiometer 52 is connected to the amplifiers 40 and 42 which are connected respectively to the laser detectors 30 and 32 thereby again summing the total polarized energy in each of the reflected beams 15 and 17. A comparator 64 compares the total energy level with the energy level set point set by the potentiometer 66. The output signal 68 from the comparator 64 is fed back to the laser 12, but in this case for controlling the laser power supply to keep the laser output intensity constant.

The method of the present invention is apparent from the description of the structure and operation of the apparatus. However, the method includes reducing the effects of random polarization on the output uniformity of a laser beam by generating a polarized laser beam, separating the laser beam into first and second polarized components that are orthogonal to each other, and measuring the energy in each of the first and second components. The method further includes measuring the total energy in both of the first and second components and comparing the total energy with a predetermined energy set point. Thereafter, the method includes controlling the energy output of the laser beam in response to the comparison of the total energy with the set point. The method may further include integrating the total energy prior to comparing the total energy with a predetermined set point. In one embodiment, the laser output energy may be controlled by turning the laser off and on. In another embodiment the laser energy output may be controlled by controlling the intensity of the laser.

The present invention, therefore, is well adapted to carry out the objects and attain the ends and advantages mentioned as well as others inherent therein. While presently preferred embodiments of the invention have been given for the purpose of disclosure, numerous changes in the details of construction, arrangement of parts, and steps of the process will be readily apparent to those skilled in the art, and which are encompassed within the spirit of the invention and the scope of the appended claims.

What is claimed is:

1. A method of reducing the effects of random polarization on the output uniformity of a generated laser beam with random polarization comprising, separating a fraction of the laser beam into first and second polarized components that are orthogonal to each other, measuring the energy in each of the first and second components, measuring the total energy in both of the first and second components, comparing the total energy with a predetermined energy set point, and controlling the energy output of the laser beam in response to the comparison of the total energy with the set point.

2. The method of claim 1 including, integrating the total energy prior to comparing the energy with a predetermined set point.

3. The method of claim 2 wherein the energy is controlled by turning the laser off and on.

4. The method of claim 1 wherein the energy is controlled by controlling the intensity of the laser.

5. An apparatus for reducing the effects of random polarization on output uniformity of polarized laser beams comprising, first and second polarizing beam splitters positioned in the polarized laser beam and positioned orthogonal to each other, said first and second beam splitters each reflecting a portion of the laser beam, laser detecting and measuring means detecting and measuring the reflected polarized energy from each of the beam splitters, comparator means comparing the sum of the measured energy from both of the beam splitters with a predetermined energy level, and control means between the comparator and the laser for controlling the output energy of the laser.

6. The apparatus of claim 5 including, an integrator between the laser detecting and measuring means and the comparator.

7. The apparatus of claim 5 wherein the first and second polarizing beam splitters are dielectric windows, and the laser detecting and measuring means are photodiodes.

* * * * *